Feb. 13, 1968    A. M. PASINSKI ET AL    3,368,394
PAPER STIFFNESS TESTER
Filed Sept. 23, 1965
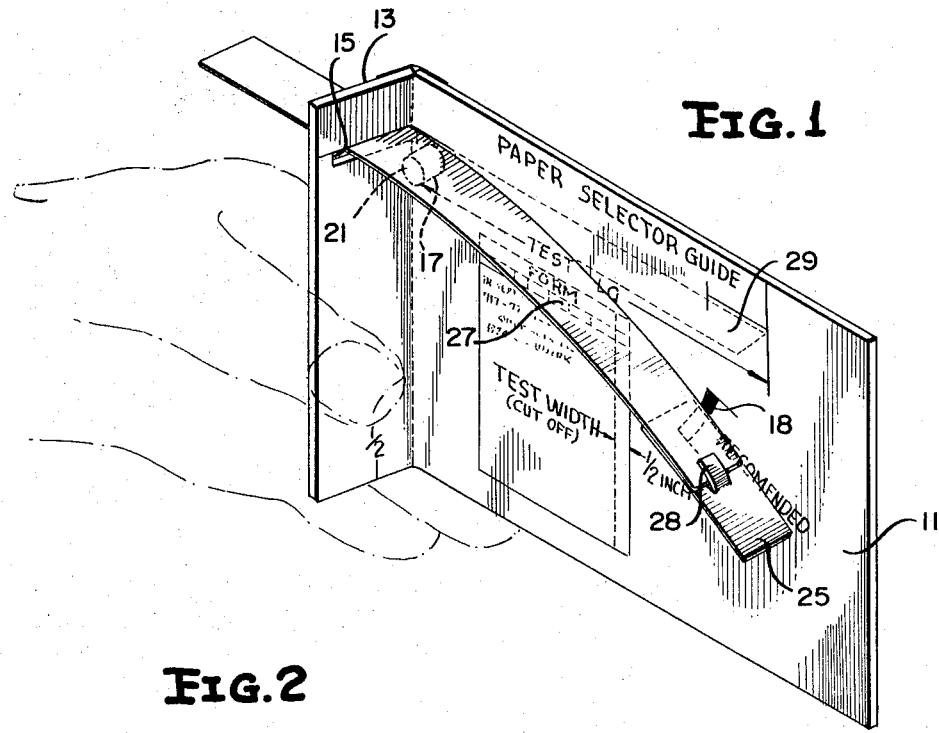
FIG. 1
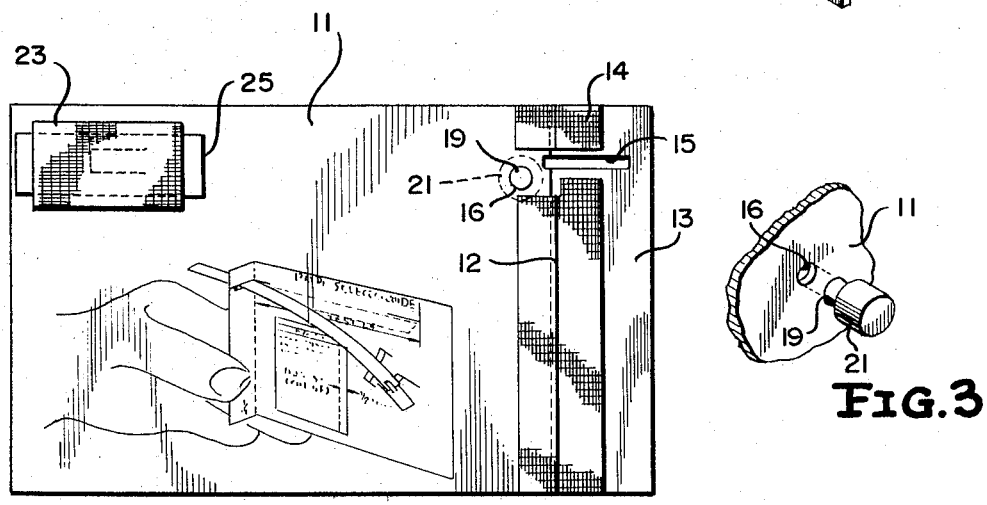
FIG. 2
FIG. 3
INVENTORS
ARTHUR M. PASINSKI &
WILLIAM B. TEMPLETON
BY    FRANK W. BARNES
            AGENT

United States Patent Office 3,368,394
Patented Feb. 13, 1968

3,368,394
PAPER STIFFNESS TESTER
Arthur M. Pasinski, Detroit, and William B. Templeton, Northville, Mich., assignors to Burroughs Corporation, Detroit, Mich., a corporation of Michigan
Filed Sept. 23, 1965, Ser. No. 489,709
4 Claims. (Cl. 73—100)

ABSTRACT OF THE DISCLOSURE

A hand-held device for testing the stiffness of paper. One end of the paper test strip is supported by a cantilever arrangement and the other end is deflected by an attachable weight. A scale is provided on the device for indicating the ranges of acceptability for the paper test strip when it is in its deflected position.

---

This invention relates to a paper stiffness tester and more specifically to a hand held tester for ascertaining the stiffness compatibility of paper forms with specific accounting machines.

Many business organizations employ some form of accounting procedures wherein high speed machines are used to record business data. Generally, formats are established which are specifically suited to the particular accounting method. As an economy measure large quantities of forms are printed with the specific format thereon. Because of the large stock of these forms, many businesses are reluctant to change their accounting equipment unless the new equipment would be compatible with the existing stock of forms.

An important measure of compatibility has been found to reside in the stiffness of a given paper form. Paper which is too stiff tends to jam the machine, while paper which is too flexible tends to tear. It is therefore necessary to have equipment which is capable of testing the stiffness of the particular forms to ascertain this compatibility.

Heretofore stiffness testers in general have been both complex and bulky. The prior art teaches the use of a steel ruler to cover a specimen to be tested for stiffness, with the edge of the ruler being matched with the end of the specimen. Weights were used to hold the sample down on a horizontal platform, and the ruler and sample were extended away from the platform. When the overhanging end of the specimen bent down through an arc and touched a predetermined degree line, the length of the overhang, as measured by the ruler, was recorded. Using this value and appropriate formulae, the stiffness of the sample was then ascertained. Other testers, such as Tabor stiffness testers, generally have been used only in laboratories and are not suitable for field demonstrations.

It will be appreciated from the foregoing that salesmen or servicemen have long needed a simple and portable tester for paper stiffness whereby they could test a prospective customer's forms to aid in their sales presentation at the time they were interviewing the prospect. Bulky or awkward equipment, along with complicated mathematics, would not aid their presentation.

It is therefore an object of this invention to provide a simple and portable paper stiffness tester.

It is an additional object of this invention to provide an inexpensive paper stiffness tester which instantaneously indicates compatibility of a given paper form with given accounting equipment.

In carrying out the above objects, applicant's invention comprises a hand held cantilever-type holder for supporting one end of a paper test strip, an attachable weight for deflecting the other end of the paper test strip in cooperation with the cantilever-type holder and a scale for indicating the ranges of acceptability of the paper test strip.

Further objects and advantages will become apparent or be specifically pointed out in the following specification when taken with the accompanying drawings in which:

FIG. 1 is an isometric representation of the front face of applicant's invention, having a sample strip therein undergoing test;

FIG. 2 shows the rear face of applicant's invention;

FIG. 3 shows a resilient stud utilized in applicant's invention.

As shown in FIG. 1, a substantially rectangular board 11, having a thickness of approximately 1/16″, has an end portion 13 foldable along a line orthogonal to the sides of the board, through an arc of approximately 90°. A partial cut 12 is made on the opposite side of the board along the fold to aid in the folding thereof. As shown in FIG. 2, reinforced pressure sensitive tape 14 is applied along the length of the cut 12 both to limit the folding arc and to retard fatigue of the remaining non-cut section of the board 11.

Referring again to FIG. 1, a slot 15 is provided near the top of the foldable end 13. A resilient stud 17, having a shank 19 and a head 21, as shown in FIG. 3, is positioned on the main body portion of the board 11 proximate slot 15. The shank portion 19 extends through a hole 16 in the board 11, said hole being slightly smaller in diameter than the diameter of the shank 19. Due to the stiffness of said board 11, a portion of the shank 19 is compressed in the hole 16, while the portion of the shank 19 extending through the board 11 is expanded to its normal diameter. This feature tends to keep stud 17 in its proper position on board 11.

A scale 18 is cooperatively positioned on the main body portion with respect to the slot 15 and the stud 17 for indicating the range of acceptable values of paper stiffness. As shown in FIG. 2, a flat, tunnel-like holder 23 retains an attachable weight 25 in a storage position on the back face of board 11 when the tester is not in use.

In operation, a strip 27 of a sample paper form or the like, is cut to a width of ½″, for example, and to a length of approximately 3″. The attachable weight 25, which is substantially rectangular and has a resilient tongue 28 therein, is attached by means of the tongue to one end of the strip 27 and the other end of the strip is passed over the head 21 of stud 17 and through slot 15. Stud 17 and slot 15 cooperate to form a cantilever with the strip 27. The proper test length for strip 27 is shown on scale 29 in FIG. 1.

The force of gravity acting on the attachable weight 25 and the strip 27 causes the strip to be deflected downwards towards the scale 18, whereon the predetermined acceptable ranges of paper stiffness are printed. When the weighted end of strip 27 falls within the limits on the scale, it is indicative that the paper form will be compatible with given accounting equipment.

Rectangular board 11 has printed on the front face thereof indices representing the proper length and width of a sample to be tested to aid the tester in preparing the test strip. The reverse side of said rectangular board 11 has a diagram representing the proper method of employing applicant's invention in the testing of a paper sample. Additionally, the board is transparently laminated to protect the device from dirt and skin oils.

Although applicant's invention has been embodied in the testing of paper, it will be apparent to those skilled in the art that the invention may be utilized to test quickly and easily the stiffness of other materials, such as thin metal and relatively rigid fabrics. It will also be apparent to those skilled in the art that variations in the specific structure illustrated, such as enlargement of the scale on the face of the tester, may be made without departing from the spirit and scope of the invention.

We claim:

1. A portable tester for measuring the stiffness of a strip of paper or the like comprising a board including a main body portion and a foldable end portion, said foldable end portion being positionable in the plane containing the main body portion when the tester is not in use and approximately orthogonal to the plane containing the main body portion when the tester is in use, said foldable end portion having a slot therein, pivot means located on said main body portion and adjacent to said slot, weight means for deflecting the test strip when the strip is inserted through said slot and rested upon the pivot means, and a scale on the surface of said main body portion for indicating the deflection and stiffness acceptability of the strip undergoing test.

2. The device in claim 1 wherein said weight means comprises a substantially rectangular weight having a resilient tongue therein for attaching said weight to said strip undergoing test.

3. The device of claim 2 including means for retaining said weight means on said board when said weight means is not in use.

4. The device in claim 1 wherein said pivot means comprises a resilient stud having a head and a shank, a portion of said shank passing through and being compressed by said board.

References Cited

UNITED STATES PATENTS

| | | | |
|---|---|---|---|
| 2,860,510 | 11/1958 | Press | 73—100 |
| 3,178,936 | 4/1965 | Finsterwalder | 73—100 |

FOREIGN PATENTS 1,114,356  12/1955  France.

RICHARD C. QUEISSER, *Primary Examiner.*

J. H. WILLIAMSON, *Assistant Examiner.*